(12) United States Patent
Tran et al.

(10) Patent No.: US 7,467,044 B2
(45) Date of Patent: Dec. 16, 2008

(54) METHOD AND SYSTEM FOR ASSESSING EXPLORATION PROSPECT RISK AND UNCERTAINTY

(75) Inventors: Kiet Tran, Houston, TX (US); William D. Wiggins, Delray Beach, FL (US); Timothy R. McHargue, Danville, CA (US); Larry J. Sydora, Moraga, CA (US); Barry Katz, Spring, TX (US)

(73) Assignee: Chevron U.S.A. Inc, San Ramon, CA (US)

( * ) Notice: Subject to any disclaimer, the term of this patent is extended or adjusted under 35 U.S.C. 154(b) by 0 days.

(21) Appl. No.: 11/623,286

(22) Filed: Jan. 15, 2007

(65) Prior Publication Data
US 2008/0172179 A1    Jul. 17, 2008

(51) Int. Cl.
*G06F 19/00* (2006.01)
*G06G 7/48* (2006.01)

(52) U.S. Cl. ............................................. 702/6; 703/10
(58) Field of Classification Search .................. 702/6, 702/2, 11, 13, 1; 705/7; 367/73; 703/5, 703/10
See application file for complete search history.

(56) References Cited

U.S. PATENT DOCUMENTS

| | | | |
|---|---|---|---|
| 6,549,854 B1* | 4/2003 | Malinverno et al. ........... | 702/16 |
| 6,587,791 B2* | 7/2003 | Dablain et al. ................ | 702/16 |
| 6,810,332 B2* | 10/2004 | Harrison ....................... | 702/13 |
| 6,980,940 B1* | 12/2005 | Gurpinar et al. .............. | 703/10 |
| 2002/0198817 A1* | 12/2002 | Dhir ............................. | 705/37 |
| 2004/0158406 A1* | 8/2004 | Harrison ....................... | 702/13 |
| 2005/0197780 A1* | 9/2005 | Moos et al. ................... | 702/14 |
| 2006/0155474 A1* | 7/2006 | Venkataramanan et al. ... | 702/13 |
| 2006/0241867 A1* | 10/2006 | Kuchuk et al. ................ | 702/13 |

OTHER PUBLICATIONS

Sahni, A., Case Study of Uncertainty Analysis in the Seismic to Reservoir Simulation Workflow, 2003, SPE 84188.*
Ruffo et al., Hydrocarbon Exploration Risk Evaluation through Uncertainty and Sensitivity Analyses Techniques, Oct.-Nov. 2006, Reliability Engineering & System Safety, vol. 91, pp. 1155-1162.*

* cited by examiner

*Primary Examiner*—Edward R Cosimano
*Assistant Examiner*—Toan M Le
(74) *Attorney, Agent, or Firm*—Torrey Pennebaker; Maurice Teixeira

(57) ABSTRACT

A method and system for integrating multiple analytical processes for evaluating risk and uncertainty elements of a petroleum system. The integrated environment provides a consistent means of analysis for evaluating multiple petroleum systems including exploration prospects and reservoirs, wherein multiple evaluation tools can be used and each of the tools has a similar "look" and "feel" so that a user can efficiently utilize all of the tools in the integrated environment. The evaluation tools analyze common data sets within the integrated environment so that a consistent evaluation of a petroleum system can be performed.

11 Claims, 6 Drawing Sheets

METHOD AND SYSTEM FOR ASSESSING EXPLORATION PROSPECT RISK AND UNCERTAINTY

TECHNICAL FIELD

The present invention relates generally to methods and systems for assessing the risk and uncertainty elements of exploration prospects prior to drilling, and more particularly, to enhancing hydrocarbon acquisition and development success rates by accurately forecasting potential risks and uncertainty elements in an integrated environment.

BACKGROUND OF THE INVENTION

Subsurface evaluation of oil and gas reservoirs are always subject to limits imposed by data quality and availability, resources, timing and costs. As a consequence, decision making should include consideration of the risks and uncertainties associated with an evaluation of the prospects and/or reservoirs. Decision analysis methods for evaluating and communicating the risks in terms of outcomes, given some defined probability distributions, are intended to be unbiased and accurate. However, comparisons of forecast and actual outcomes for projects typically show that more projects outcomes are below the median forecast (P50) values than above, indicating that in general the input probability distributions used are inaccurate and biased.

Evaluating the potential production of hydrocarbons from an exploration prospect is important in determining the economic viability of an oil, gas or oil-gas field development scheme, An exploration prospect can include one or more subsurface structures that may or may not be hydrocarbon reservoirs. Several tools exists which assist in making such risk and uncertainty evaluations and predications of quantity and commercial viability of hydrocarbons. These tools also assist in deciding how best to develop a field and how to plan for contingencies related to the uncertainties in the knowledge of the subsurface characteristics of the field in addition to uncertainties associated with implementing a particular field development scheme.

Software tools additionally exist for assessing the difference between actual and predicted outcomes for the development of the field which allow the user to predict volumetric output but not necessarily the ability to recover hydrocarbons, or the commercial viability of a specific hydrocarbon reservoir. Such known software tools provide a single reservoir analysis without a broader understanding of risks elements of the entire prospect such as: structural integrity, reservoir quality, and amplitude of each reservoir within a prospect. Available software tools provide methods for separate analysis of risk and uncertainty associated with a single reservoir risk element. In other words, the risk and uncertainty for each reservoir risk element is analyzed separately and such methods do not account for the interrelations and dependencies between the risk elements within a petroleum system.

In reality the reservoir risk elements are interrelated and dependant on one another and need to be evaluated as a whole, on a reservoir level and eventually on a prospect level, to ensure commercial success of the hydrocarbon prospect. As used herein, the term risk and/or uncertainty element(s) means the risk and uncertainty associated with an identified subsurface characteristic of interest. Another issue with the prior art software tools is that when different tools are used for risk and uncertainty evaluations of different characteristics of a particular prospect or reservoir, each of those tools will have differing graphical user interfaces that require the geologists or petroleum engineers to use valuable time to learn how to use each of the tools.

While prior art methods are capable of measuring the uncertainty of specific risk aspects of a particular reservoir there are currently no known methods of evaluating that overall risks and uncertainties on a prospect level in an integrated environment. There is a need for an integrated environment which provides a consistent graphical user interface for both input and output that enables a user to be able to interface with mulitiple reservoir evaluation tools without having to use valuable time to learn multiple software applications. The present invention thus provides an efficient way of storing and accessing information regarding the entire petroleum system, prospect and reservoirs. Moreover, because the reservoir evaluation tools of the present invention utilize the data stored in the integrated environment, the data used for each evaluation will be consistent.

Petroleum companies evaluate hundreds of prospects around the world at any one time, improving the hydrocarbon acquisition and development success rates by accurately forecasting potential risks and uncertainty elements, even a small fraction, will save petroleum companies potentially billions of dollars. Continued widespread and variable inconsistencies between predicted reserves and field production show there is a need for methods, software tools and analyses which can assess the integrated risks and confidence of each of the hydrocarbon reservoirs and the entire prospect. The present invention is intended to address this need.

SUMMARY OF THE INVENTION

The present invention overcomes the above-described and other shortcomings of the prior art by addressing the need for an integrated assessment of the risk and uncertainty of an exploration prospect. The present invention includes an integrated environment wherein each risk elements of each reservoir of interest is evaluated and considered within the overall prospect review.

One embodiment of the present invention includes a method for integrating multiple analytical processes for evaluating risk and uncertainty elements of an exploration prospect. The method includes defining at least one exploration prospect in an integrated environment, and defining at least one reservoir for a reservoir included in the exploration prospect. The method also includes defining parameters for a plurality of reservoir evaluation tools for the reservoir in the integrated environment. The method further includes applying one of the reservoir evaluation tools to a subset of reservoir information, and integrating the reservoir evaluation tool results and data regarding the exploration prospect and the reservoir to generate a risk and uncertainty scorecard in the integrated environment. The method includes repeating the above-described steps for each of the plurality of reservoir evaluation tools wherein each reservoir evaluation tool is applied to a related subset of reservoir information, and each risk an uncertainty scorecard has a comparable output format.

In another embodiment, the present invention utilized the reservoir evaluation tools to determine the risk and uncertainty with such reservoir characteristics as reservoir amplitude, reservoir seal capacity or quality, reservoir volume and visualization, and hydrocarbon charge.

The present invention includes an integrated environment wherein each of the reservoir evaluation tools utilizes similar graphical user interfaces. Thus, a user only has to learn how to use one evaluation tools to evaluate a petroleum system as each of the tools will have similar formats. As used herein the present invention includes a "reservoir evaluation tool" that term is used to describe evaluation tools that are used for assessing the risk and uncertainty associated with petroleum systems, prospects and reservoirs. This element of the present invention greatly reduces the time a user will have to spend learning each of the evaluation tools by giving the user a similar "look" and "feel" for each of the reservoir evaluation tools in the integrated environment. In one embodiment of the present invention, the risk and uncertainty scorecard generated for each of the reservoir evaluation tools include similar graphical outputs.

As described above, a hydrocarbon prospect or reservoir will go through many evaluation through the life of a project. Petroleum companies need to constantly evaluate and measure risk and uncertainty of the hydrocarbon prospects and reservoirs in their portfolios. A company's portfolio may contain hundreds of hydrocarbons prospects and reservoirs, both potential and current, where evaluations on those prospects and reservoirs are being continuously run from initial identification and exploration to the last stages of production. In one embodiment of the present invention, the integrated environment allows for information regarding an exploration prospect and associated reservoir to be stored in the integrated environment. The present invention thus provides an efficient way of storing and accessing information regarding the prospect and reservoirs. Moreover, because the reservoir evaluation tools of the present invention utilize the data stored in the integrated environment, the data used for each evaluation will be consistent.

It should also be appreciated that since the prospects and reservoirs in a company's portfolio can be stored in the integrated environment of the present invention, analysis could be run at the portfolio level. That analysis could include identifying the high risk prospects, cost analysis and assessing which prospects or reservoirs are ready to go forward and be developed. The integrated environment of the present invention additionally provides a method of ensuring that each prospect or reservoir within a company's portfolio goes through the same analysis and evaluations.

It should be appreciated that the exploration prospect characteristics can include the name, location and type of the prospect and/or reservoir.

Because of the highly sensitive nature and commercial value of the information stored within the integrated environment, one embodiment of the present invention includes a security feature, wherein access privileges must be granted to a user.

It should also be appreciated that the software embodying the present invention can be stored on various electronic means such as hard drive, discs and other recordable medium.

Additional features and advantages of the present invention are described in, and will be apparent from, the following Detailed Description of the Invention and the Figures.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

Figure 1:
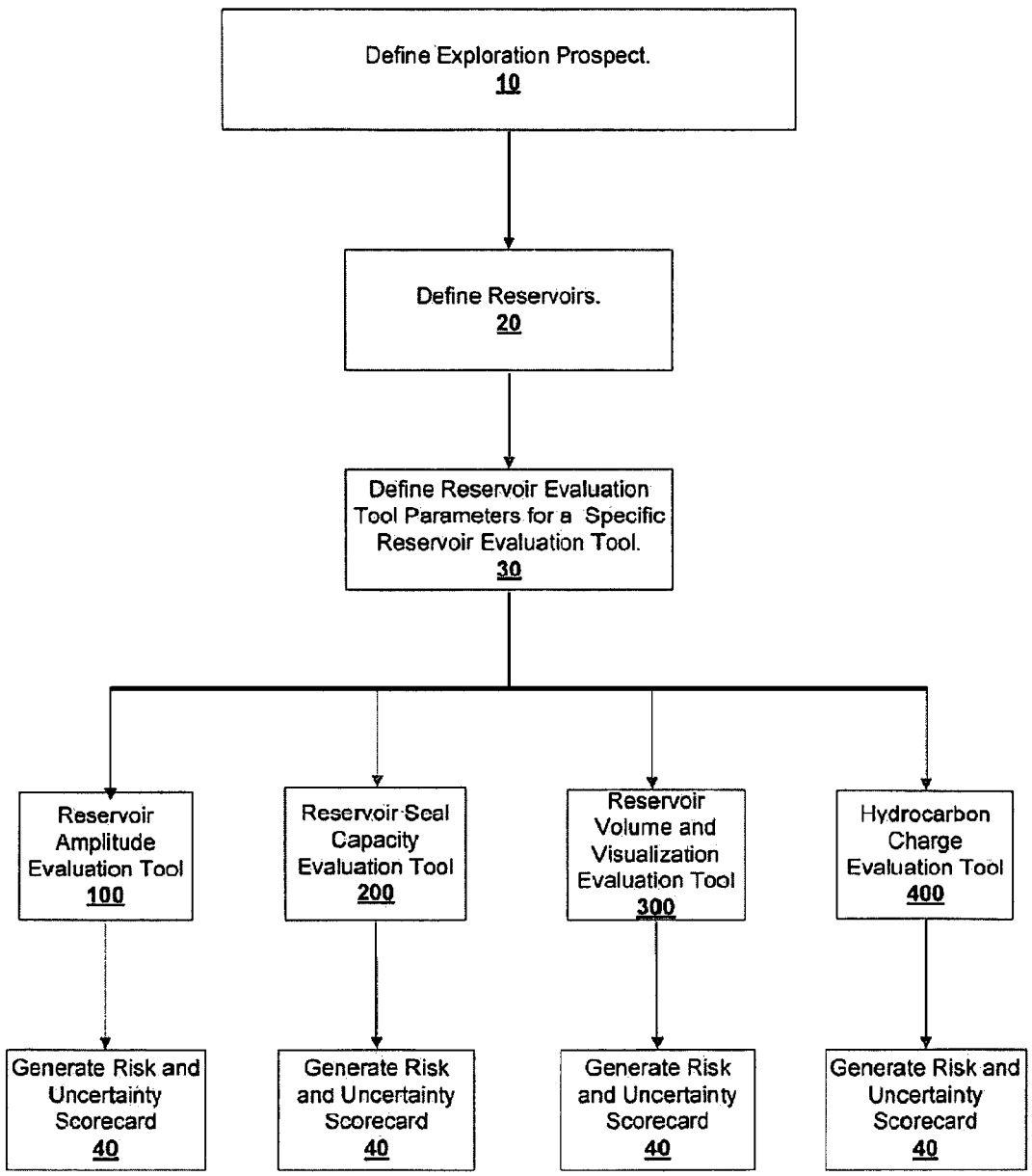
FIG. 1 shows a flowchart illustrating an overview of steps taken in a preferred embodiment of the present invention for determining risk and uncertainty elements of an exploration prospect in an integrated environment.

The present invention provides a novel tool and method for integrating different evaluation processes for evaluating the risk and uncertainty elements of exploration prospects prior to drilling. Accurately forecasting potential risks and uncertainty elements increase hydrocarbon acquisition and development success rates. The software tool of the present invention is referred to herein as the "Advisor Workflow" or program. The Advisor Workflow is the software framework used to integrate the reservoir evaluation software tools, which evaluate the risk and uncertainty associated with various prospect and/or reservoir attributes. Capturing and integrating risk and uncertainty information for each reservoir within a prospect is important for a full understanding of the exploration prospect or petroleum system.

The reservoir evaluation software tool may include tools for determining the risk and uncertainty associated with reservoir amplitude, reservoir seal capacity of quality reservoir volume and visualization, and/or hydrocarbon charge (referred to individually as "Reservoir Evaluation Tool" or collectively as "Reservoir Evaluation Tools"). Those skilled in the art will appreciate that there are numerous other subsurface attributes that may be used in a reservoir evaluation tool for determining the risk and uncertainty associated with a prospect. By way of example, and not limitation, a reservoir evaluation tool may determine the risk and uncertainty associated with the likelihood of deepwater reservoir presence. Additionally, the integrated environment of the present invention can also include related analytical tools associated with evaluating the prospects and/or reservoirs such as column height calculator, volume estimation tool, and analog catalog for deepwater reservoirs.

As one skilled in the art can appreciate, reservoir characteristics or attributes such as amplitude, seal capacity and/or volume and visualization are quantified through the collection and analysis of geological data. Two main types of data come from well log and seismic data. Seismic data is considered in the art to be "soft" data. Seismic data must go through multiple highly interpretive and analytical steps before the data can be used to interpret the attributes of a prospect or reservoir. Even after the data is processed and imaged, an experienced geologist must still interpret the various 2D and 3D geological models to identify potentially hydrocarbon-bearing subsurface formations. Well data is considered to be "hard" data as actual geological formations are sampled or recorded to provide a more realistic determination of the subsurface geology. However, exploratory wells are expensive and during he initial stages of exploration may not be available for a particular area. Even if well logs are available for a particular prospect or reservoir they generally provide sparse information on an entire prospect's or reservoir's geology as well logs are accurate only for the geology in the vicinity of the borehole. Petroleum companies are constantly evaluating the quality and the risk and uncertainty of the data for a given prospect or reservoir to determine the commercial viability of exploration prospects and producing reservoirs. The present invention provides an integrated environment wherein reservoir evaluation tools which determine multiple risk and uncertainty elements efficiently analyze the same data, characteristics and parameters of a given prospect or reservoir.

A prospect is identified as having potential recovered hydrocarbons. Geological and geophysical data is collected for the subsurface characteristics of the potential reservoirs within the prospect. The reservoirs comprising the prospect can be addressed individually or can be addressed collectively on a prospect level using the Advisor Workflow. In either case the program user answers questions related to subsurface characterization data availability and quality for each risk aspect within each Reservoir Evaluation Tool.

The Advisory Workflow links and integrates the Reservoir Evaluation Tools creating a common interface and common output formats, permitting users to learn one tool with the ability to access and use all of the Reservoir Evaluation Tools. Using a weighted system, the Advisor Workflow generates a risk and uncertainty scorecard for subsurface attributes or characteristics using he results from a Reservoir Evaluation Tool, and the information regarding the prospect and reservoir characteristics. Each Reservoir Evaluation Tool can be applied to each reservoir identified within a prospect. The Advisor Workflow will provide a risk and uncertainty scorecard for each Reservoir Evaluation Tool applied to a reservoir within a prospect.

As described-above, each Reservoir Evaluation Tool analyzes a specific prospect or reservoir attribute using a series of questions. A user answers those questions using a set of answers which have been generated and weighted by experienced geologists, petroleum engineers, geophysicists and other analysts. The weighted answers are then utilized to generate the risk and uncertainty scorecards. Thus, less experienced personnel can benefit from the experience of a company's more seasoned personnel. This is extremely important in the petroleum industry, where as mentioned; much of the interpretation, processing and even in some cases obtaining data is highly interpretive. Successful petroleum companies have been through many trials and tribulations in finding and producing commercially viable hydrocarbon reserves. The experiences and analytical skills of the seasoned personnel are in valuable. The present invention provides a method whereby the experiences and analytical skills of a company's seasoned personnel can be preserved and utilized by less experienced personnel. The present invention thus provides an analytical tool which provides a consistent evaluation of a company's portfolio of prospects and reservoirs.

Petroleum companies typically receive data in various formats from multiple vendors and the present invention additionally provides a method for efficiently gathering and processing data to provide a complete analysis of the prospect for commercial viability. The Advisor Workflow results for each reservoir are available for evaluation and comparison at the reservoir level and at the prospect level, providing an efficient and complete analysis of the entire prospect. The calculated scorecard is used as a basis for the prospect production forecasts and reserves estimates and can be performed before investment in drilling and the collection of hard data, such as well log data. As the prospect evaluation process matures and more information becomes available the initial Advisor Workflow results can be used for comparative review and updating. This provides a mechanism to continuously fine-tune the prospect evaluation process to accurately forecast potential risks and uncertainty elements and increase hydrocarbon acquisition and development success rates.

Now each of the above steps in one embodiment of the present invention will be described in greater detail. FIG. 1 illustrates a workflow of one embodiment of the present invention. A prospect is defined as having a potential of a plurality of hydrocarbon recovery reservoirs. The first step in the Advisor Workflow process is to define an exploration prospect using geographical and geological information 10. A user enters information in the integrated environment of the Advisor Workflow such as the prospect name, residing country, block, latitude and longitude to define the prospect. Other prospect information which can also be entered is expected hydrocarbon type: oil, gas, and/or mixture; the basin and geologic type, such as: 4-way trap, stratigraphic trap, compressional flood, salt related structure, U/T, or D/T fault trap, and channel/overbank. In a preferred embodiment, the Advisor Workflow is a secured environment, permitting the user to identify members and access privileges.

The next step illustrated in FIG. 1 is defining the geological and geophysical data that has been collected for the subsurface characteristics of the potential reservoirs within the prospect 20. The reservoirs comprising the prospect can be addressed individually or can be addressed collectively on a prospect level using the Advisor Workflow. The Advisor Workflow user enters generic reservoir information for each reservoir of interest in the prospect. Information relating to a reservoir such as the reservoir name, status, structural trap type, true vertical depth (TDDss), depth below mudline, age, expected hydrocarbon type, stratigraphic trap type, and depth of water, to define and characterize each reservoir. Reservoir status information relates the level of the reservoir evaluation process, for example: concept, lead, prospect, discovery, dry, or goes to appraisal and development. Reservoir structural trap type, for example: 3-way, salt weld, combination, fault/salt weld, faulted 4-way or none. The TDDss is the measured depth to the crest of the reservoir structure, including water depth and depth below mudline. Reservoir age is entered such as Pleistocene, Pliocene, Miocene, Oligocene, Eocene, Triassic, and/or Permian. Expected hydrocarbon types include oil, gas, condensate and/or oil and gas mixture. Stratigraphic trap type entries may include: none, truncation, lateral pinchout, lateral facies change, channel, and/or other.

Each reservoir of interest within an exploration prospect is defined as described above using available geological and geophysical data and information. Additional reservoirs can be added to a prospect within the Advisor Workflow as the prospect evaluation process matures and additional reservoirs are identified.

After a reservoir is defined in the Advisor Workflow, the user determines the subsurface characteristics of interest and selects the corresponding Reservoir Evaluation Tool for determining the risk and uncertainty associated with the subsurface characteristic of interest. The Reservoir Evaluation Tools may include tools for determining the risk and uncertainty associated with reservoir amplitude, reservoir seal capacity or quality, reservoir volume and visualization, and/or hydrocarbon charge. The user defines the Reservoir Evaluation Tool parameters for the selected Reservoir Evaluation Tool to be used 30 as illustrated in FIG. 1. If should be appreciated that other types of the Reservoir Evaluation Tools may be used and are considered within the scope of the present invention.

The parameters for each Reservoir Evaluation Tool have been designed to capture information and assumptions known by experienced geologists and geophysicists to influence the risk and uncertainty associated with the subsurface characteristic of interest. Parameters for the Reservoir Amplitude Evaluation Tool may include information related to the interpreter to account for interpretation bias, expected amplitude versus offset (AVO), top of overpressure TVDss depth, and seismic data type and scope. While parameters for a Reservoir Seal Evaluation Tool may include information related to the interpreter, fault name, top seal analog basin, type of fluid contacting the seal, fault calculation type, top seal name, fault seal analog basin, top seal lithology and pore pressure.

The selected Reservoir Evaluation Tool is then applied to the parameters. The user can enter parameters for one or more Reservoir Evaluation Tool and apply each Reservoir Evaluation Tool to a one or more reservoirs defined within the prospect. The user selects and applies the Reservoir Evaluation Tool corresponding to the entered parameters. As described-above, the Reservoir Evaluation Tool provides a set of answers to a series of questions related to each of the process with the selected Reservoir Evaluation Tool. The questions for each Reservoir Evaluation Tool have been designed to capture information and assumptions known by experienced geologists and geophysicists to influence the risk and uncertainty associated with the subsurface characteristic of interest.

In a preferred embodiment, the questions asked within each Reservoir Evaluation Tool overlap, providing a process check and ensuring data integrity in data considered in the integrated Advisor Workflow.

In the embodied of the present invention illustrated in FIG. 1, the Reservoir Evaluation Tools illustrated are the Reservoir Amplitude Evaluation Tool 100, the Reservoir Seal Capacity Evaluation Tool 200, the Reservoir Volume and Visualization Evaluation Tool 300, and the Hydrocarbon Charge Evaluation Tool 400. The Reservoir Evaluation Tools will be described in greater detail later in the specification.

The last step in the Advisor Workflow is to generate a risk and uncertainty scorecard for each Reservoir Evaluation Tool applied to a reservoir 40. The reservoir Evaluation Tools calculate a score for associated risk and uncertainty static and dynamic characterizations, and provides a measure of how robust or technically consistent a proposed development scheme is given the complexities and uncertainties in the definition of the scheme and of the reservoir(s). The scores allow comparison with other development schemes and with other projects, assist in planning additional subsurface technical work by highlighting the key uncertainties which are likely to impact the outcomes, and are valuable in determining the relative confidence of the probabilistic production estimates for the field.

The information analyzed by each of the Reservoir Evaluation Tools is interrelated and dependant on the information analyzed by the other Reservoir Evaluation Tools within the integrated environment of the Advisor Workflow. This allows the Advisor Workflow user to evaluate the results a whole on a reservoir level and eventually on a prospect level. In a preferred embodiment of the present invention, the Reservoir Evaluation Tool also identifies issues and problems with the data that the Tool has used in its evaluation process. The Reservoir Evaluation Tool also identifies whether or not the data for a prospect or reservoir is complete and where gaps, if any, in the data are. Identification of strengths and weaknesses of each of the components analyzed in each of the Reservoir Evaluation Tools is graphically displayed to indicate the level of "goodness" and level of confidence associated with each component.

It should be appreciated that any other information relevant to the commercial viability and success of the prospect and reservoir(s) can be included. Steps 20 through 40 of the workflow illustrated in FIG. 1 (including the Reservoir Evaluation Tools 100-400) can be repeated to score additional reservoirs in the same prospect.

The present invention allows for the evaluation process to be continuously updated as new information or data becomes available. The scorecards 40 from the same Reservoir Evaluation Tool for various reservoirs are comparable within a prospect and with other reservoirs in different prospects. The scorecards generated from the various Reservoir Evaluation Tools within a reservoir are integrated because the questions asked within each Reservoir Evaluation Tool are comparable.

One of the problems that the present invention solves is that current software tool having differing inputs, outputs and analytical process that provide biased and inconsistent evaluations. The prior art tools requires a user to individually learn how to use each one of the differing tools. The present invention solves this problem by providing an integrated environment wherein the data input and output have similar formats, thus requiring a user less time to learn how to use the Advisor Workflow than existing prior art software tools. In one embodiment of the present invention, the output of the Reservoir Tools include a graphical format, such as a spider graph, to indicate areas lacking sufficient data scope or quality, and the level of confidence associated with each component analyzed.

Figure 2:
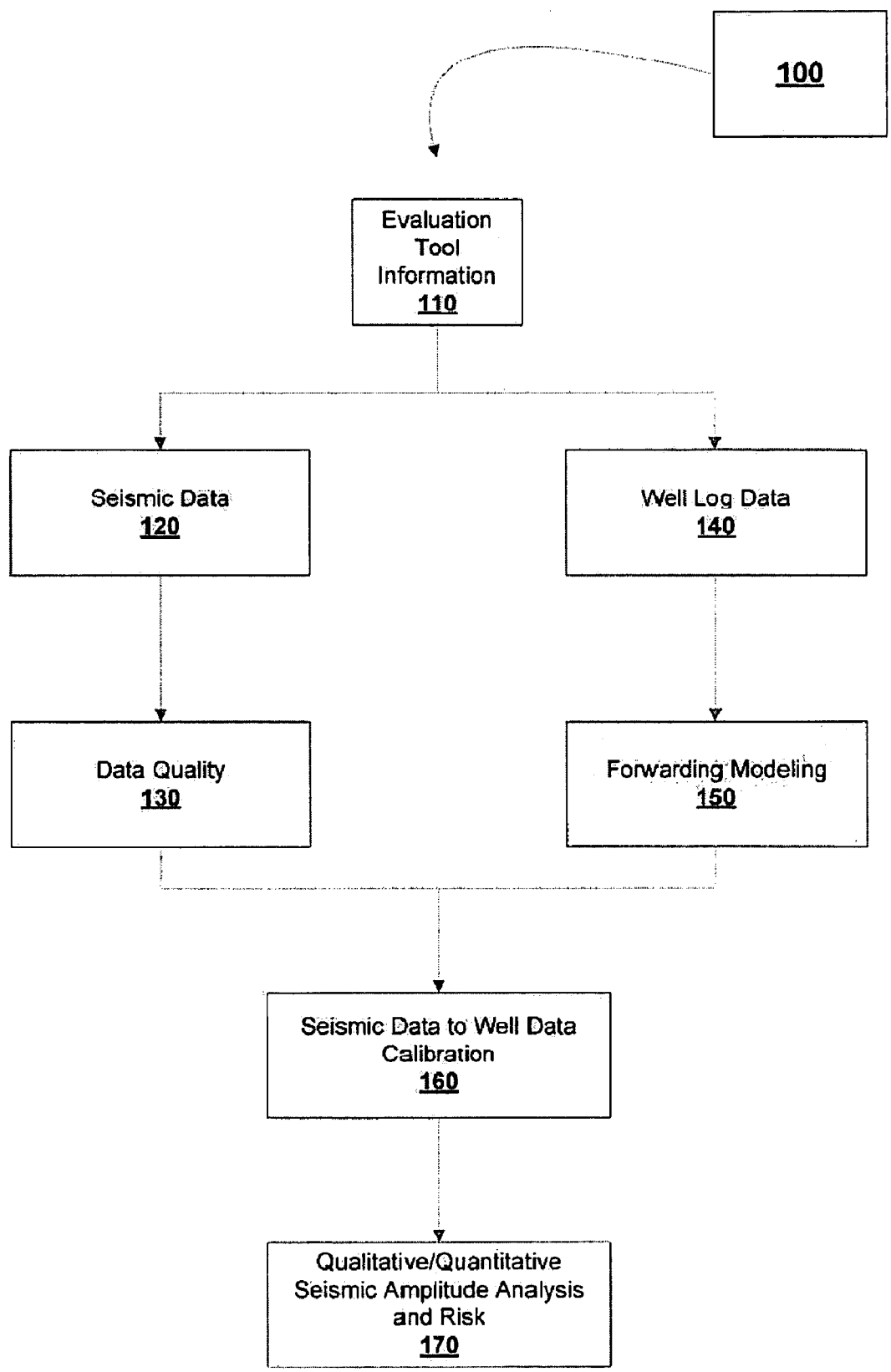
FIG. 2 shows a flowchart of the steps used in a preferred embodiment of the present invention for determining reservoir amplitude risk and uncertainty.

FIG. 2 illustrates one embodiment of the workflow of the Reservoir Amplitude Evaluation Tool 100. The workflow includes querying the user on various topics relating to reservoir amplitude, specifically regarding the quality and type of data, and the analysis which went into determining the reservoir amplitude. Evaluation Tool Information is first entered 110 such as data, user, version and the status of the exploratory stage or development. The Reservoir Amplitude Evaluation Tool 100 then generates series of questions each with a related set of answers for the user to choose from directed to seismic data 120, seismic data quality 130, well log data 140, forward modeling 150, and seismic data to well data calibration 160. Once those steps have been completed the scorecard for qualitative/quantitative seismic amplitude analysis and risk is generated 170.

Figure 3:
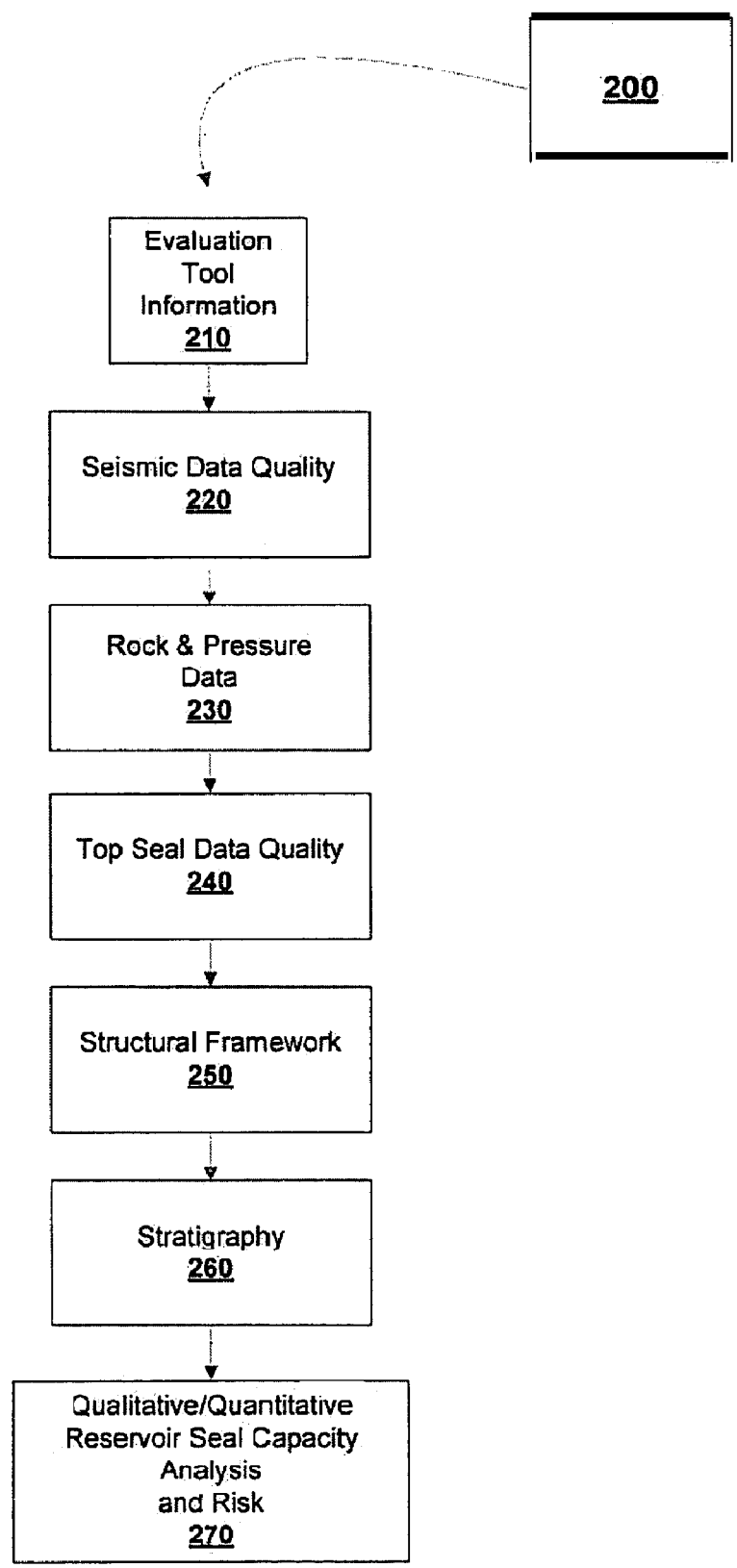
FIG. 3 shows a flowchart of the steps used in a preferred embodiment of the present invention for determining reservoir seal capacity risk and uncertainty.

FIG. 3 illustrates one embodiment of the workflow of the Reservoir Seal Capacity Evaluation Tool 200. Similar to the Reservoir Evaluation Tool 100, the workflow includes querying the user on various topics relating to reservoir seal capacity, again regarding the quality and type of data, and the analysis which went into determining the reservoir seal capacity. Evaluation Tool Information is first entered 210, and then the Reservoir Seal Capacity Evaluation Tool 200 generates a series of questions each with a related set of answers for the user to choose directed towards seismic data quality 220, rock and pressure data 230, tope seal data quality 240, structural framework of the reservoir 250, and stratigraphy 260. Once those steps have been completed the scorecard for qualitative/quantitative reservoir seal capacity analysis and risk is generated 270.

Figure 4:
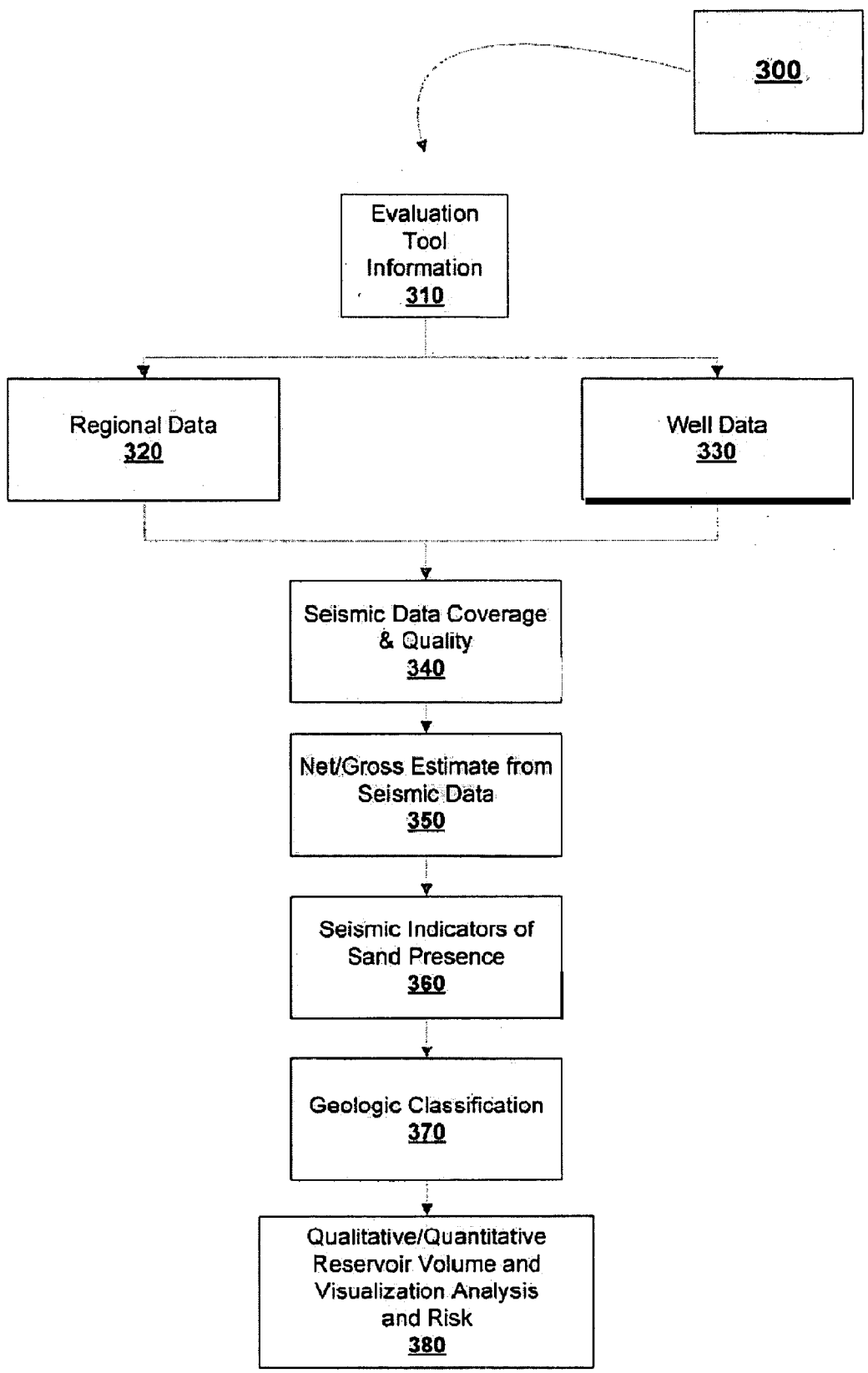
FIG. 4 shows a flowchart of the steps used in a preferred embodiment of the present invention for determining reservoir volume and visualization risk and uncertainty.

FIG. 4 illustrates one embodiment of the workflow of the Reservoir Volume and Visualization Evaluation Tool 300. As described above, the workflow includes querying the user on various topics relating the reservoir volume and visualization regarding the quality and type of data, and the analysis that went into determining the reservoir and prospect volume and visualization. Evaluation Tool Information is first entered 310, and the Reservoir Volume and Visualization Evaluation Tool 300 generates a series of questions each with a related set of answers for the user to choose directed towards geologic regional data 320, well data 330, seismic data coverage and quality 340, net/gross estimate from seismic data 350, seismic indicators of sand presence 360, and geological classification 370. Once those steps have been completed the scorecard for qualitative/quantitative reservoir volume and visualization analysis and risk is generated 380.

Figure 5:
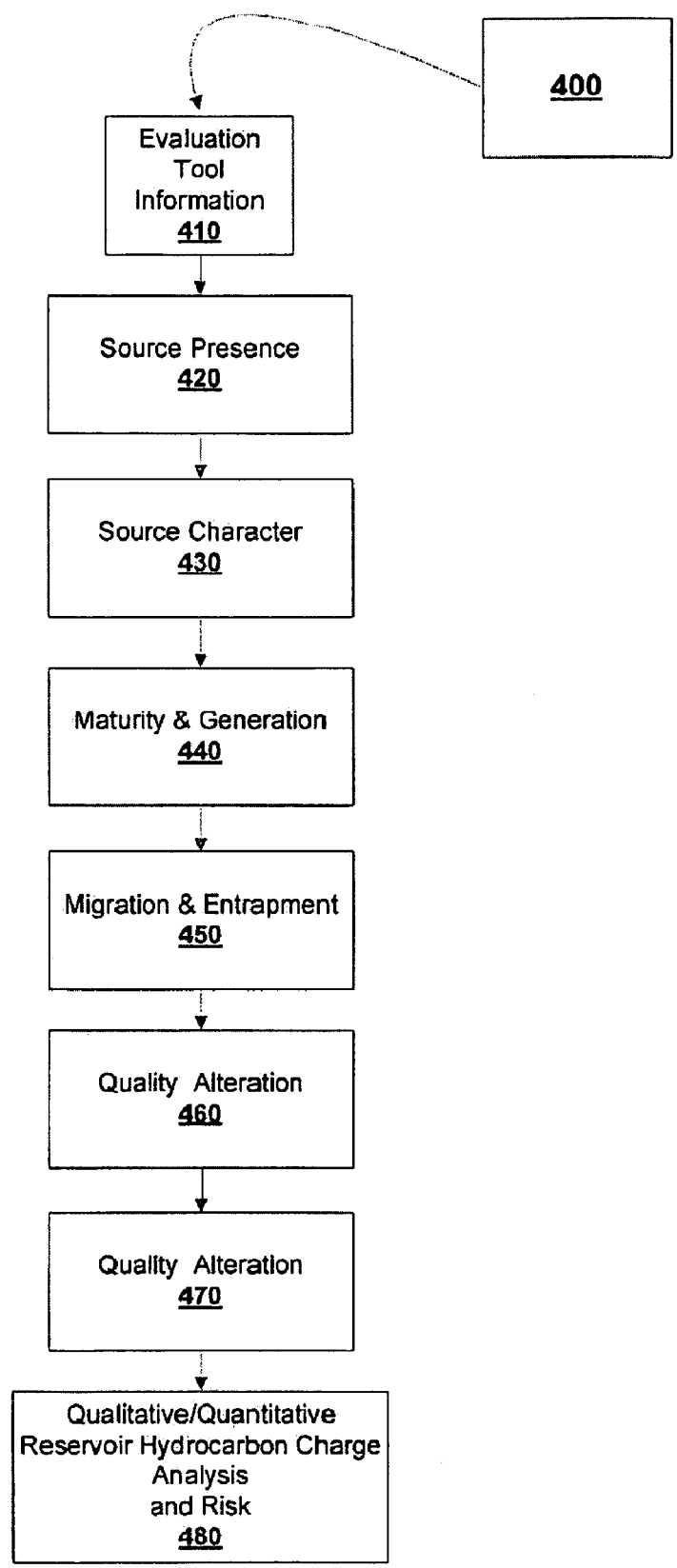
FIG. 5 shows a flowchart of the steps used in a preferred embodiment of the present invention for determining hydrocarbon charge risk and uncertainty.

FIG. 5 illustrates one embodiment of the workflow of the Hydrocarbon Charge Evaluation Tool 400. As described above, the workflow includes querying the user on various topics relating to the hydrocarbon charge regarding the quality of type of data, and the analysis that went into determining the hydrocarbon charge. Evaluation Tool Information if first entered 401, and the Hydrocarbon Charge Evaluation Tool 400 generates a series of questions each with a related set of answers for the user to choose directed towards source presence 420, source character 430, maturity and generation 440, migration and entrapment 450, quality alteration 460, and hydrocarbon volumes 470. Once those steps have been completed the scorecard for qualitative/quantitative hydrocarbon charge analysis and risk is generated 480.

Figure 6:
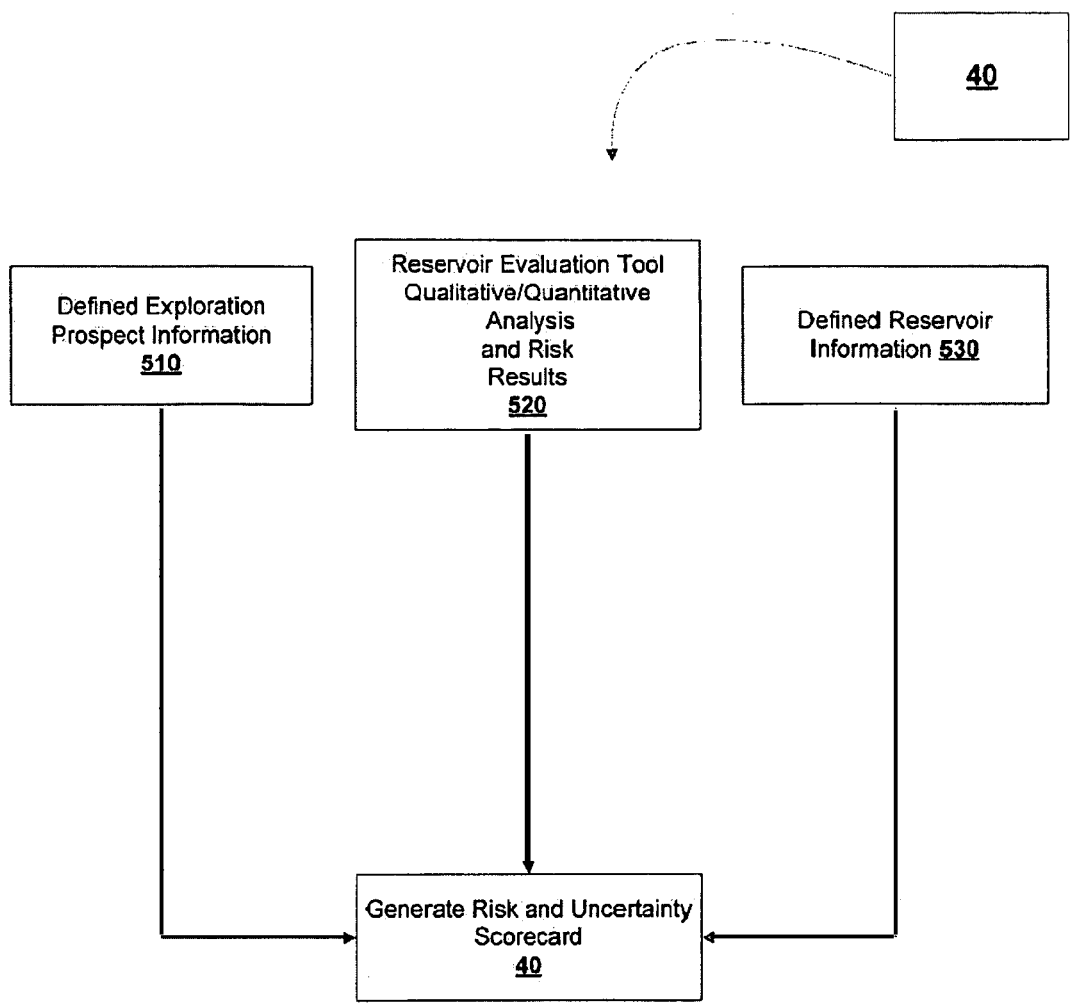
FIG. 6 shows a flowchart of the steps used in a preferred embodiment of the present invention for generating a risk and uncertainty scorecard.

FIG. 6 illustrates that each risk and uncertainty scorecard 40 utilized the Defined Exploration Prospect Information 510, the Reservoir Evaluation Tool Qualitative/Quantitative Analysis and Risk Results 520 for a Reservoir Evaluation Tool, and the Defined Reservoir Information 530.

While in the foregoing specification this invention has been described in relation to certain preferred embodiments thereof, and many details have been set forth for purpose of illustrations, it will be apparent to those skilled in the art that the invention is susceptible to alteration and that certain other details described herein can vary considerably without departing from the basic principles of the invention.

What is claimed is:

1. A computer implemented method for evaluating risk and uncertainty elements of an exploration prospect within an integrated environment comprising multiple reservoir evaluation tools, the method comprising:
   (a) storing geological and geophysical information related to an exploration prospect and associated reservoirs in an integrated environment, wherein the integrated environment includes a graphical user interface and multiple reservoir evaluation tools;
   (b) defining at least one exploration prospect in the integrated environment;
   (c) defining at least one associated reservoir in the exploration prospect in the integrated environment;
   (d) defining parameters for a plurality of reservoir evaluation tools for the reservoir in the integrated environment, wherein the reservoir evaluation tools assess risk and uncertainty of reservoir characteristics;
   (e) applying one of the reservoir evaluation tools to a subset of the geological and geophysical information for a specified reservoir characteristic,
   (f) integrating the reservoir evaluation tool results and the defined information regarding the exploration prospect and the reservoir to generate a risk and uncertainty scorecard in the integrated environment; and
   (g) repeating steps (c) to (f) for each of the plurality of reservoir evaluation tools wherein each reservoir evaluation tools is applied to a related subset of the geological and geophysical information, and each risk and uncertainty scorecard has a comparable output format, wherein the risk and uncertainty scorecard is used to forecast potential risks and uncertainty elements associated with the exploration prospect.

2. The method of claim 1, wherein the reservoir characteristics include any one of reservoir amplitude, reservoir seal capacity or quality, reservoir volume and visualization, and hydrocarbon charge.

3. The method of claim 1, wherein each risk and uncertainty scorecard includes a graphical output.

4. The method of claim 3, wherein the graphical output includes identification of the level of confidence associated with each of the characteristics analyzed in the reservoir evaluation tool.

5. The method of claim 1, wherein defining the exploration prospect includes inputting name, location, and type of prospect.

6. The method of claim 1, wherein defining the reservoir includes inputting name, location, depth, age, type of hydrocarbons, stratigraphic trap type, and water depth of a reservoir.

7. The method of claim 1, wherein the integrated environment includes security and access privileges for users.

8. The method of claim 1, wherein the risk and uncertainty scorecard identifies data which is missing from the analysis of any one of the reservoir evaluation tools.

9. The method of claim 1, wherein the reservoir evaluation tool includes a series of questions related to the specified reservoir characteristics, and each questions has a set of weighted answers for a user to choose from.

10. A computer implemented system for evaluating the risk and uncertainty elements of an exploration prospect within an integrated environment, the system comprising:
    an integrated environment comprising multiple reservoir evaluation tools and a graphical user interface wherein a user is enabled to perform a method comprising:
    storing geological and geophysical information related to an exploration prospect and associated reservoirs;
    defining at least one exploration prospect and at least one associated reservoir in the exploration prospect;
    defining parameters for the plurality of reservoir evaluation tools, wherein the reservoir evaluation tools assess risk and uncertainty of reservoir characteristics;
    appling one of the reservoir evaluation tools to a subset of the geological and geophysical information for a specified reservoir characteristic; and
    generating a risk and uncertainty scorecard for the specified reservoir characteristic utilizing the reservoir evaluation tool results and the defined information relating to the exploration prospect and the reservoir, to determine potential risks and uncertainty associated with the exploration prospect.

11. The method of claim 10, wherein the reservoir evaluation tool includes a series of questions related to the specified reservoir characteristic, and each question has a set of weighted answers for a user to choose from.

* * * * *